(12) United States Patent  (10) Patent No.: US 8,860,962 B2
Moribayashi  (45) Date of Patent: Oct. 14, 2014

(54) INFORMATION PROCESSING APPARATUS, INFORMATION PROCESSING METHOD, AND COMPUTER PROGRAM PRODUCT FOR THE INFORMATION PROCESSING

(75) Inventor: Yuta Moribayashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 141 days.

(21) Appl. No.: 13/337,560

(22) Filed: Dec. 27, 2011

(65) Prior Publication Data

US 2012/0170066 A1 Jul. 5, 2012

(30) Foreign Application Priority Data

Jan. 5, 2011 (JP) .................................. 2011-000765

(51) Int. Cl.
 *G06F 3/12* (2006.01)
 *G06K 15/02* (2006.01)
(52) U.S. Cl.
 CPC .......... *G06K 15/186* (2013.01); *G06K 15/1825* (2013.01)
 USPC ............................. 358/1.13; 400/582; 358/1.1
(58) Field of Classification Search
 USPC ........................................ 358/1.13; 400/582
 See application file for complete search history.

(56) References Cited

U.S. PATENT DOCUMENTS

2006/0221358 A1\* 10/2006 Takahashi ...................... 358/1.1
2009/0323109 A1\* 12/2009 Mori ............................. 358/1.15
2011/0150551 A1\* 6/2011 Oba .............................. 400/582

FOREIGN PATENT DOCUMENTS

JP  2008-227584  9/2008

\* cited by examiner

*Primary Examiner* — Thomas D Lee
*Assistant Examiner* — Bharatkumar Shah
(74) *Attorney, Agent, or Firm* — Oblon, Spivak, McClelland, Maier & Neustadt, L.L.P.

(57) ABSTRACT

An information processing apparatus includes: a determining unit that determines whether first direction of a document that is first allocated on a first printing sheet in combination, matches second direction, which represents an orientation of a document that is first allocated on a second printing sheet in combination; a changing unit that changes, if the first direction does not match the second direction, an output order of the documents to be printed on the second printing sheet such that, if the orientation of the second printing sheet does not match the first direction after the documents to be output are allocated on the second printing sheet in accordance with a designated combining order, an order in which the documents are arranged when to be printed on the second sheet matches the designated combining order; and an output control unit that outputs the documents in a changed output order.

10 Claims, 11 Drawing Sheets

INFORMATION PROCESSING APPARATUS, INFORMATION PROCESSING METHOD, AND COMPUTER PROGRAM PRODUCT FOR THE INFORMATION PROCESSING

CROSS-REFERENCE TO RELATED APPLICATIONS

The present application claims priority to and incorporates by reference the entire contents of Japanese Patent Application No. 2011-000765 filed in Japan on Jan. 5, 2011.

BACKGROUND

1. Technical Field

The present invention relates to an information processing apparatus, an information processing method, and a computer program product for the information processing.

2. Description of the Related Art

There is a need to reduce the amount of paper resources used when printing a document using a printer. Through a print setting screen, a printer driver allows for settings for combined printing, which enables the printing of multiple pages (2, 4, 6, 9, and 16 pages) to be allocated on a single sheet, and for two-sided printing that enables printing on the front and back sides of a single sheet. This technology has been applied as a layout technique for changing the combining order in which multiple pages are arranged from upper left to lower right or from upper right to lower left.

During combined printing and two-sided printing, if a printer driver or print processor rotates or reduces a page to be printed, the pass-through system does not rotate or reduce characters or graphics, which results in a printed result that the user did not desire. However, there is a known technology in which a printer performs combined printing and two-sided printing so as to solve the above problem that occurs with the pass-through system.

Japanese Patent Application Laid-open No. 2008-227584 discloses an image processing apparatus that displays a preview image that represents a result that is obtained by setting, to image data, a process, such as combined printing, that is selected from various setting process items so that the layout of documents allocated for the combined printing is set in accordance with user's instructions.

If the printer performs combined printing and two-sided printing in a conventional manner, different layouts are applied to the front and back sides of a printing sheet, which is due to the documents containing pages having different orientations, i.e., portrait orientations and landscape orientations. Thus, there is a problem in that the document is not printed out in the layout intended by the user.

BRIEF SUMMARY

An information processing apparatus includes: a determining unit that determines whether a first direction, which represents an orientation of a document that is first allocated on a first printing sheet to be printed in combination, matches a second direction, which represents an orientation of a document that is first allocated on a second printing sheet in combination, the second printing sheet being to be printed after the first printing sheet; a changing unit that changes, if the first direction does not match the second direction, an output order of the documents to be printed in combination on the second printing sheet such that, if the orientation of the second printing sheet having the second direction does not match the first direction after the documents to be output are allocated on the second printing sheet in accordance with a designated combining order, an order in which the documents are arranged when to be printed on the second sheet matches the designated combining order; and an output control unit that outputs the documents in a changed output order that is changed by the changing unit.

An information processing method for an in formation processing apparatus that includes a determining unit, a changing unit, and an output control unit, the method includes: determining, by the determining unit, whether a first direction, which represents an orientation of a document that is first allocated on a first printing sheet to be printed in combination, matches a second direction, which represents an orientation of a document that is first allocated on a second printing sheet in combination, the second printing sheet being to be printed after the first printing sheet; changing, by the changing unit, if the first direction does not match the second direction, an output order of the documents to be printed in combination on the second printing sheet such that, if the orientation of the second printing sheet having the second direction does not match the first direction after the documents to be output are allocated on the second printing sheet in accordance with a designated combining order, an order in which the documents are arranged when to be printed on the second sheet matches the designated combining order; and output-controlling, by the output control unit, that includes outputting the documents in a changed output order that is changed by the changing unit.

A computer program product includes a non-transitory computer-usable medium having computer-readable program codes embodied in the medium for an information processing apparatus that includes a determining unit, a changing unit, and an output control unit, the program codes, when executed, causing a computer to execute: determining, by the determining unit, whether a first direction, which represents an orientation of a document that is first allocated on a first printing sheet to be printed in combination, matches a second direction, which represents an orientation of a document that is first allocated on a second printing sheet in combination, the second printing sheet being to be printed after the first printing sheet; changing, by the changing unit, if the first direction does not match the second direction, an output order of the documents to be printed in combination on the second printing sheet such that, if the orientation of the second printing sheet having the second direction does not match the first direction after the documents to be output are allocated on the second printing sheet in accordance with a designated combining order, an order in which the documents are arranged when to be printed on the second sheet matches the designated combining order; and output-controlling, by the output control unit, that includes outputting the documents in a changed output order that is changed by the changing unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an information processing apparatus, an information processing method, and a computer program product for the information processing are explained in detail below with reference to the accompanying drawings.

First Embodiment

Figure 1:
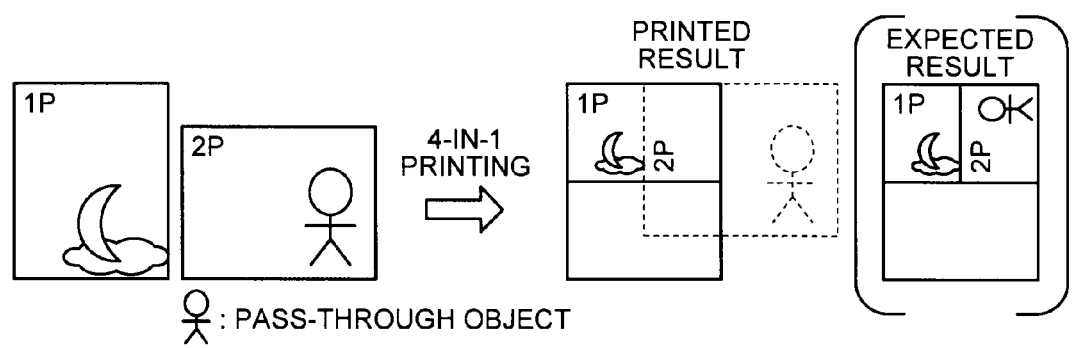
FIG. 1 is a diagram that illustrates an exemplary printed result that is obtained in a case when a document that includes a pass-through object is rotated and reduced by a device other than a printer and is then printed in combination.

First, an explanation is given, with reference to FIG. 1, of the problem that occurs in the above-described pass-through system. FIG. 1 is a diagram that illustrates an exemplary printed result that is obtained in a case when a document that includes a pass-through object is rotated and reduced by a device other than a printer and is then printed in combination.

A pass-through system is a processing system in which a page description language (PDL) code is directly generated by an application itself and is sent to a printer via a printer driver. In the pass-through system, if a printing attribute of a specific page is changed and, in order to match the changed printing attribute, the page is rotated or enlarged/reduced by a printer driver or a print processor, data other than pass-through target data is rotated or enlarged/reduced. Because the pass-through target data is not altered, only the data other than the pass-through target data is rotated or enlarged/reduced as a printed result, which results in outputting that the user did not desired.

FIG. 1 illustrates an example in which pass-through target data (a pass-through object) is contained in the second page (2P). If the two pages of the documents are printed in a 4-in-1 combination, the expected printed result (expected result) illustrated on the right side of FIG. 1 is not obtained; conversely, the printed result illustrated in the middle of FIG. 1 is obtained.

One of methods for solving the above-described problem that occurs in the pass-through system is as follows. A unique code is added to a pass-through object when a PDL code is generated. This unique code is analyzed, and the code is changed or a new code is added so that the object is rotated or reduced; thus, the pass-through object can be rotated or reduced as well as a non pass-through object during the combined printing or two-sided printing performed by the printer.

Figure 2:
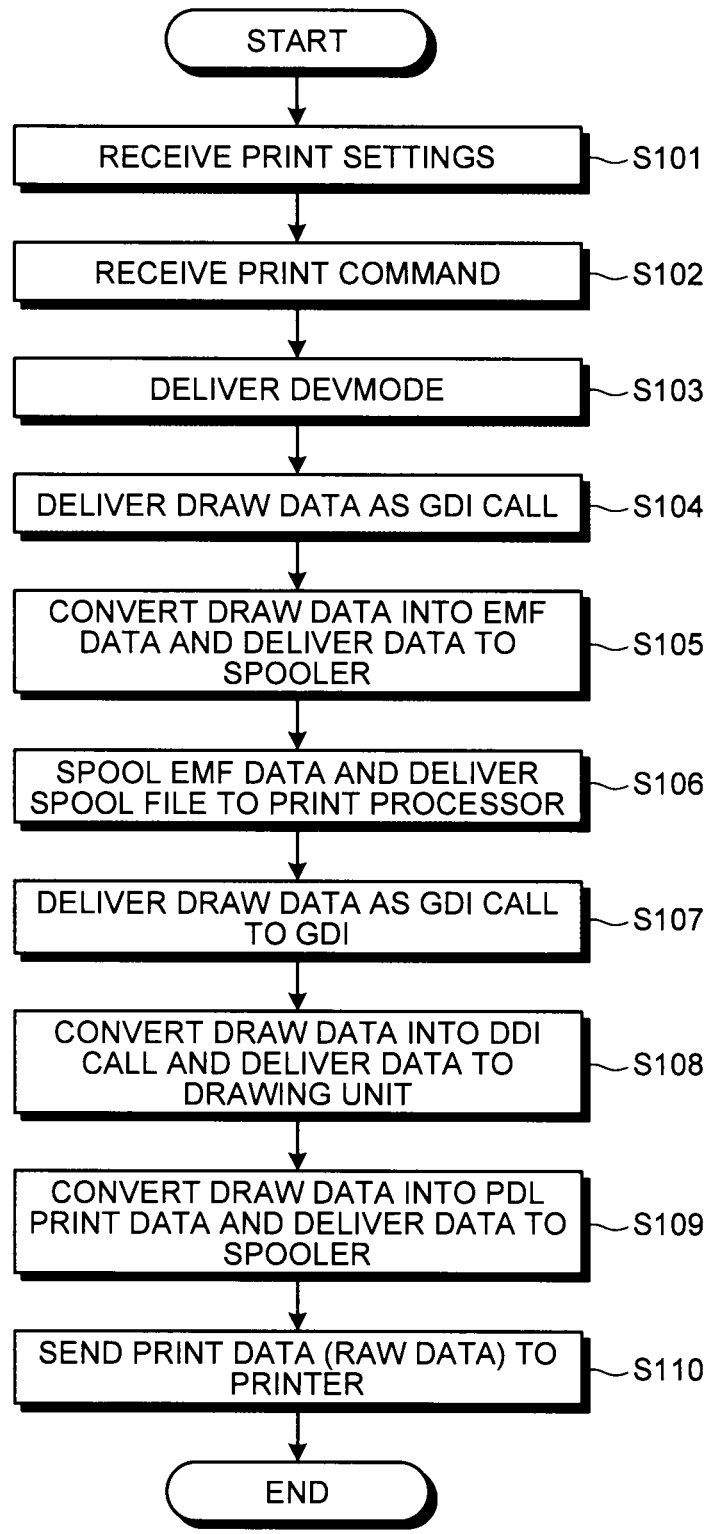
FIG. 2 is a flowchart that illustrates an example of a print-command sending process processed in a conventional method.

There is a known method for solving the problem that occurs in the pass-through system by performing the combined printing or two-sided printing with the printer, as described above. An explanation is given below of the details of the problem that occurs with this method. FIG. 2 is a flowchart that illustrates an example of a print-command sending process processed in a conventional method. The print-command sending process refers to a process performed from when a user gives a command for printing to when print data is sent to a printer.

First, a UI unit of a printer driver receives the print settings that are specified by the user (Step S101). An application receives an instruction (print command) for the printing designated by the user (Step S102). The application delivers the DEVMODE, which is a data structure in which the print settings are stored, to a graphical device interface (GDI) and the printer driver (Step S103). Furthermore, the application delivers draw data, for which printing has been commanded, to the GDI as a GDI call (Step S104).

The GDI converts the received draw data into enhanced metafile format (EMF) data and delivers the converted EMF data to a spooler (Step S105). The spooler spools the EMF data and delivers a spool file to the print processor (Step S106).

The print processor delivers the draw data to the GDI as a GDI call (Step S107). The GDI converts the received draw data into a device driver interface (DDI) call and then delivers the DDI call to a drawing unit of the printer driver (Step S108). The drawing unit converts the received draw data into PDL print data that can be interpreted by the printer and delivers the print data to the spooler (Step S109). The spooler sends the received print data (RAW data) to the printer (Step S110).

Figure 3:
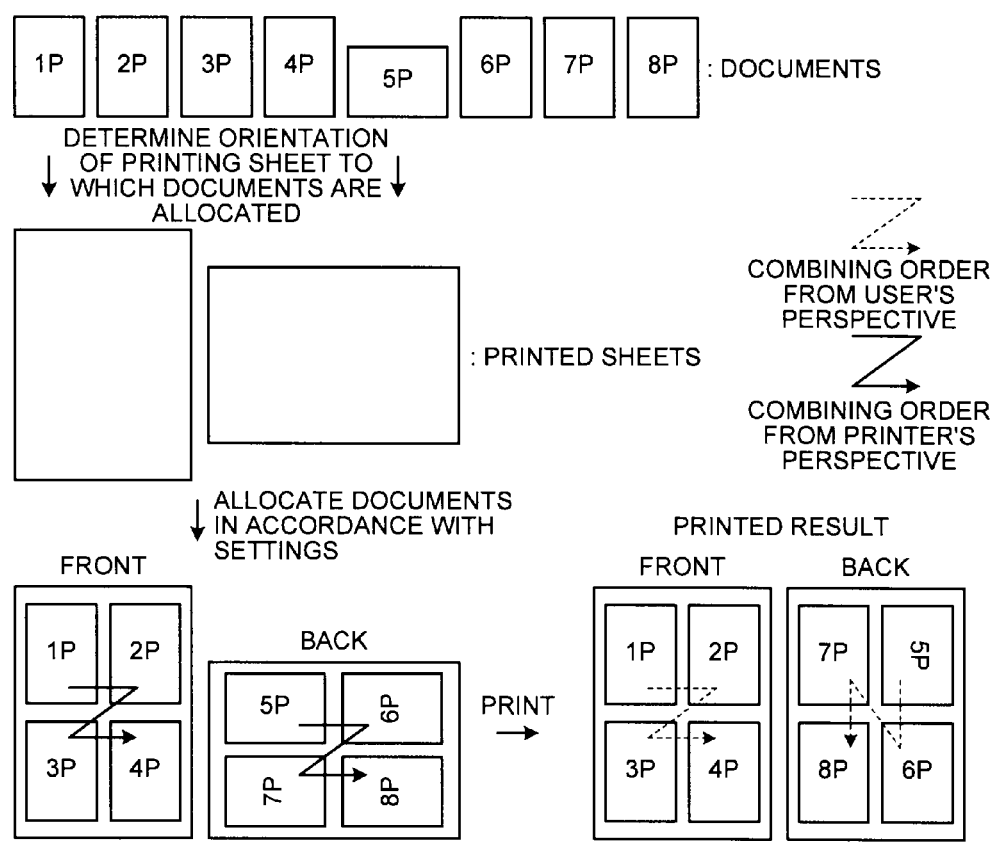
FIG. 3 is a diagram that illustrates an example of a processed result that is processed by a printing process in a conventional method.

FIG. 3 is a diagram that illustrates an example of a processed result that is processed by a printing process in a conventional method. FIG. 3 illustrates an example of a printed result of a total of 8 pages of documents (originals) with different document orientations, for which the settings are specified for combined printing, for two-sided printing, and for the combining order, i.e., "upper left, upper right, lower left, and then lower right".

If a printer performs the combined printing and two-sided printing, the printer determines the orientation of the printing sheet to which the documents are allocated depending on the first page allocated to the printing sheet (i.e., the first page and the fifth page in FIG. 3). Therefore, the documents are printed in combination on the back side of the printing sheet in the order of "upper left, upper right, lower left, and then lower right", which is on the basis of the landscape orientation that is the orientation of the fifth page, which is the first page allocated to the back side. Thus, as illustrated in FIG. 3, if a total of 8 pages of documents with different document orientations (i.e., the first to fourth pages and the sixth to eighth pages: portrait orientation, and the fifth page: landscape orientation) are subjected to combined printing (4-in-1) and two-sided printing, the documents are printed on the back side of the sheet in the order of "upper right, lower right, upper left, and then lower left" although the setting has been specified for the combining order of "upper left, upper right, lower left, and then lower right".

After the two-sided printing performed on one sheet including the front and back sides, the user reads the sheet in the portrait orientation that is the orientation of the front side and, when reading the back side, turns over the sheet in the portrait orientation. Therefore, there is a problem in that the user sees the documents on the back side printed in a combining order that the user did not intend.

According to a first embodiment, the order of pages of the documents to be printed in combination is changed so that the documents are printed on all of the printing surfaces in the layout intended by the user.

Figure 4:
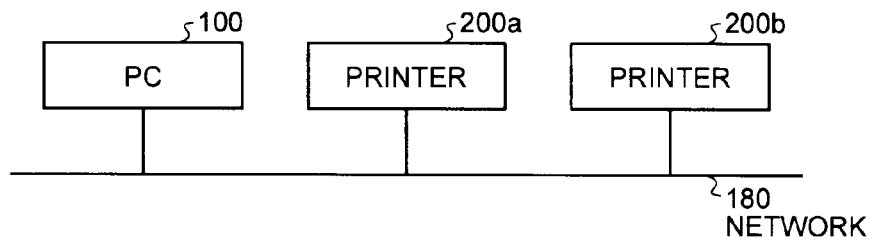
FIG. 4 is an overall configuration diagram of a printing system that is connected to an information processing apparatus according to a first embodiment.

FIG. 4 is an overall configuration diagram of a printing system that is connected to an information processing apparatus according to the first embodiment. As illustrated in FIG. 4, in the printing system, a personal computer (PC) 100, which is an information processing apparatus, a printer 200a, and a printer 200b (hereafter, collectively referred to as a printer 200) are connected to one another via a network 180.

The PC 100 receives, from a user, an instruction to print the print data, an instruction to perform combined printing, or the like, and sends the print data to the printer 200 in accordance with the instruction so that the printer 200 prints out the data. The printer 200 prints out the print data in accordance with the print instruction received from the PC 100.

Figure 5:
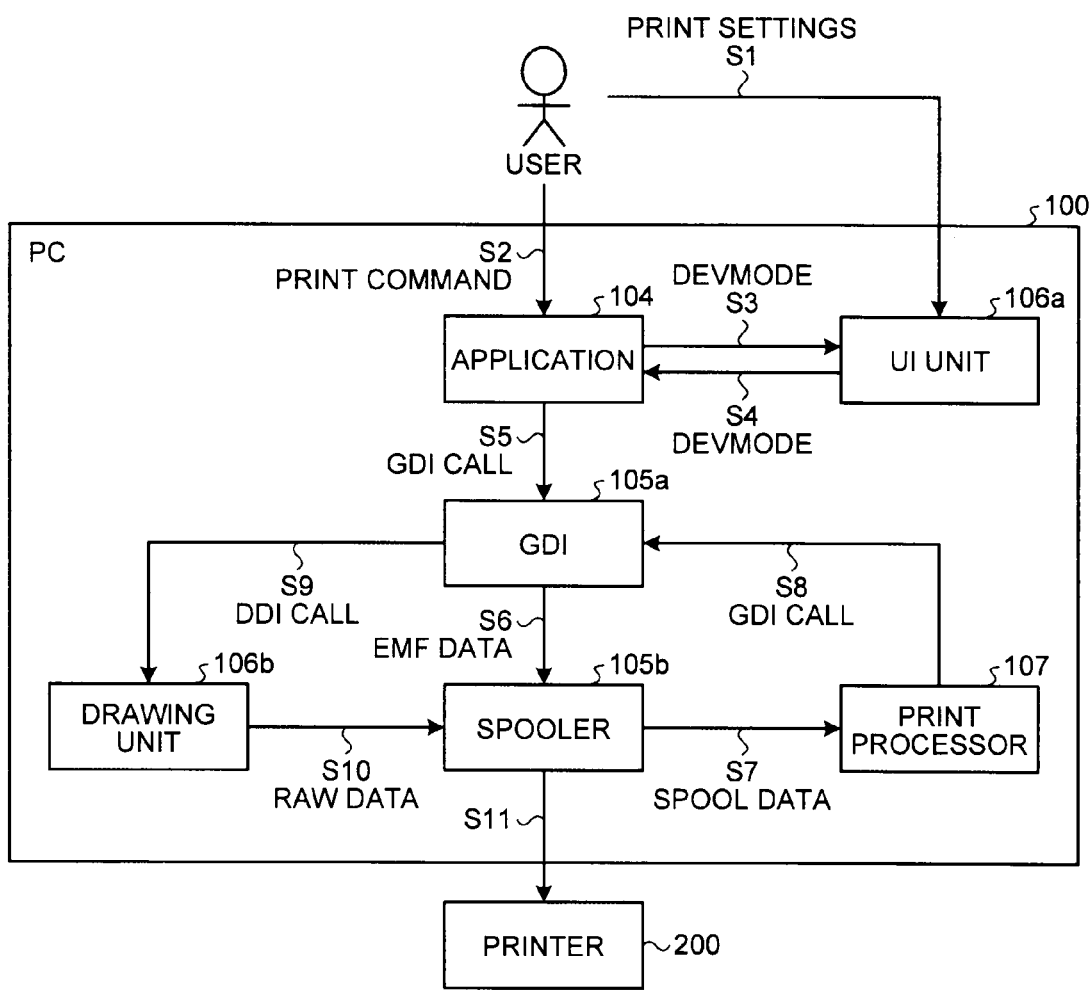
FIG. 5 is a flow diagram that illustrates a sequence of operations of the Windows (registered trademark) print architecture.

Next, an explanation is given of the outline of the flow of the printing operation performed by the PC 100, which uses a Windows (registered trademark) print architecture. FIG. 5 is a flow diagram that illustrates a sequence of operations of the Windows print architecture. As illustrated in FIG. 5, the PC 100 includes a UI unit 106a that is included in a printer driver and that receives the print settings from a user; an application 104 that receives a print command from a user; a GDI 105a that sends to the printer driver a command received from a print processor 107; a drawing unit 106b that is included in the printer driver and that converts the language form of data; a spooler 105b that stores print data; and the print processor 107 that functions as a page control unit that controls a process for sending to the printer driver the print data received from the spooler 105b. The PC 100 is connected to the printer 200. An explanation is given later of the details of the function and the configuration of each unit.

The UI unit 106a receives the changed print settings from the user (Step S1). The application 104 receives a print command from the user (Step S2). The application 104 sends and receives to and from the UI unit 106a the structure (not illustrated) that is called DEVMODE and includes the print settings so as to receive the user's print settings (Steps S3 and S4). Here, the application 104 receives, as well as the print settings, a designation of print data to be printed. The print data is generated in an EMF format by the application 104.

The application 104 delivers, to the GDI 105a, a print command for print data as a GDI call (Step S5). The GDI 105a delivers, to the spooler 105b, the print data in the EMF format as spool data (Step S6). After spooling all print data generated by the application 104, the spooler 105b sends to the print processor 107 a notification that the print data is to be despooled and then despools the print data in the print processor 107 (Step S7).

The print processor 107 reads the print data received from the spooler 105b, edits the data of each page, and delivers the edited contents to the GDI 105a as a GDI call (Step S8). Here, the print processor 107 draws the print data in the device context and edits it in accordance with the print settings received by the UI unit 106a.

The GDI 105a delivers to the drawing unit 106b the GDI call received from the print processor 107 as a DDI call (Step S9).

When receiving the DDI call from the GDI 105a, the drawing unit 106b converts the print data in the EMF format, for which the print command has been issued, into RAW data and sends the converted RAW data to the spooler 105b (Step S10).

The spooler 105b sends to the printer 200 the RAW data received from the drawing unit 106b (Step S11).

Figure 6:
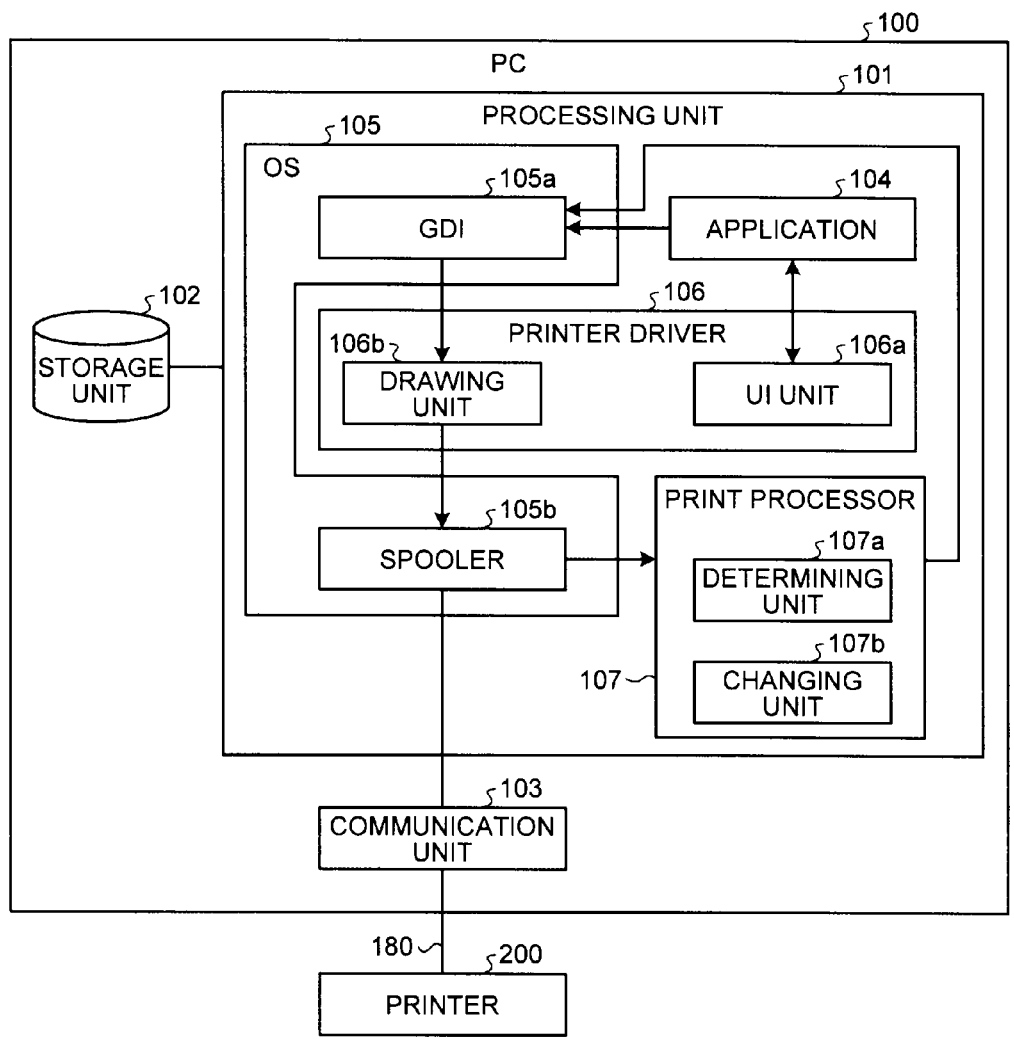
FIG. 6 is a block diagram that illustrates the configuration of a PC.

FIG. 6 is a block diagram that illustrates the configuration of the PC 100. As illustrated in FIG. 6, the PC 100 includes a processing unit 101, a storage unit 102, and a communication unit 103. The processing unit 101 includes an undepicted central processing unit (CPU), which is a control unit, and includes a group of memories including a ROM and a RAM that is a main memory. When the PC 100 is started up and operating, the application 104, an OS 105, various drivers (only a printer driver 106 is illustrated in FIG. 6), and the print processor 107 are read from the ROM and the storage unit 102, loaded and applied to the main memory, and executed by the CPU.

Although the PC 100 has a hardware configuration that uses a commonly-used computer that includes an input device, such as a keyboard or mouse, and an output device, such as a display, they are omitted in FIG. 6 for ease of explanation.

The functional blocks, which will be described later, of the processing unit 101 illustrated in FIG. 6 are the functions or units of a main unit that can control the printing of the printer 200.

The storage unit 102 stores various types of information. Specifically, the storage unit 102 is an HDD, or the like. The stored information includes setting information that defines information (any information necessary for a process, such as a set value used for a process, or display information to change the set value) related to a process for performing the function of the printer driver 106.

The communication unit 103 is a network I/F that sends and receives information to and from the printer 200 that is connected via the network 180.

The application 104 is software (for example, word-processing software) by which the user can give a command for printing. If the data edited by the user that uses the application 104 is printed out, the application 104 receives the user's print command. In this case, the application 104 does not generate print data for the printer 200 by itself. The application 104 delivers, as the DEVMODE, information on a print target as well as a print request in response to the print command to the GDI 105a and the UI unit (printer driver) 106a. The UI unit 106a receives, for example, the print settings for combined printing, bookbinding, or the like, from the user and sets it in the DEVMODE.

The OS 105 is a program that controls the hardware and software of the PC 100. The OS 105 controls a program so as to be started up, controls information so as to be read and stored, or the like. MS Windows (registered trademark), or the like, is a typical OS. The GDI 105a of the OS 105 delivers as a DDI call, to the printer driver 106, information (text data, graphic data, image data, and the like) on a print target together with a print request that includes setting information and that has been delivered as a GDI call from the application 104. The print data generated by the printer driver 106 is stored in the spooler 105b and then sequentially fed to the communication unit 103 so as to be sent to the printer 200.

The print processor 107 functions as a process control unit that processes print data. The print processor 107 receives the spooled print data from the spooler 105b. Furthermore, the print processor 107 changes the order of pages (originals) of the documents to be printed so that the order of pages becomes the combining order intended by the user. The print processor 107 then delivers draw data to the GDI 105a as a GDI call. The print processor 107 includes a determining unit 107a and a changing unit 107b.

The determining unit 107a determines whether the order of documents needs to be changed. For example, the determining unit 107a determines whether the orientation (first direction) of the document that is first allocated to the reference printing sheet (first printing sheet), where the first allocated document is among the documents to be printed in combination on the first printing sheet, matches the orientation (second direction) of the document that is first allocated to the printing sheet (second printing sheet), where the first allocated document is among the documents to be printed in combination on the second printing sheet and where the second printing sheet is printed after the first printing sheet. If the first direction does not match the second direction, the determining unit 107a determines that the order of the documents to be printed in combination on the second printing sheet needs to be changed.

If it is determined that the order of the documents needs to be changed, the changing unit 107b changes the output order of the documents to be printed in combination on the second printing sheet. The changing unit 107b changes the output order of the documents to be printed in combination on the second printing sheet so that, if the orientation of the second printing sheet in the second direction is changed to the orientation in the first direction after the documents output are allocated to the second printing sheet in accordance with a designated combining order, the order in which the documents are arranged matches the combining order.

The UI unit 106a of the printer driver 106 controls a user interface (UI) that receives the print settings from a user.

The drawing unit 106b of the printer driver 106 converts the print data generated by the application 104 into a format that can be understood by the printer. For example, the drawing unit 106b converts the print data in an EMF format generated by the application 104 into data in a RAW format. The drawing unit 106b outputs the converted RAW data to the spooler 105b. The drawing unit 106b functions as an output control unit that, if the output order of documents is changed by the changing unit 107b, outputs print data (RAW data) on the documents in the changed output order.

Figure 7:
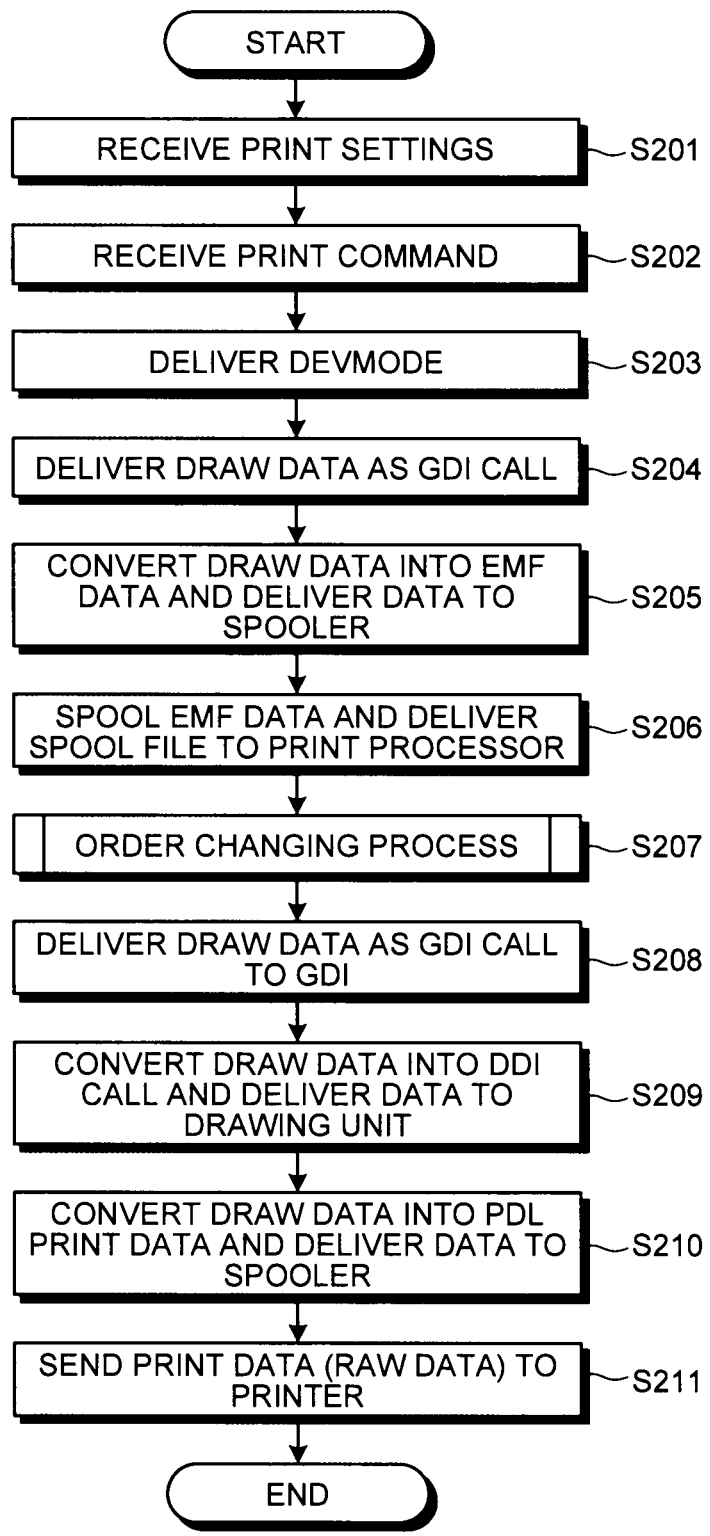
FIG. 7 is a flowchart that illustrates an example of the steps of a print-command sending process performed by the PC.

Next, an explanation is given of the steps of a process for sending a print command to the printer 200, which is performed by the PC 100 that is configured as described above. FIG. 7 is a flowchart that illustrates an example of the steps of the print-command sending process performed by the PC 100.

The print-command sending process illustrated in FIG. 7 is different from the print-command sending process illustrated in FIG. 2 in that an order changing process is additionally performed at Step S207. Because the other steps are the same as those illustrated in FIG. 2, their explanations are omitted.

Figure 8:
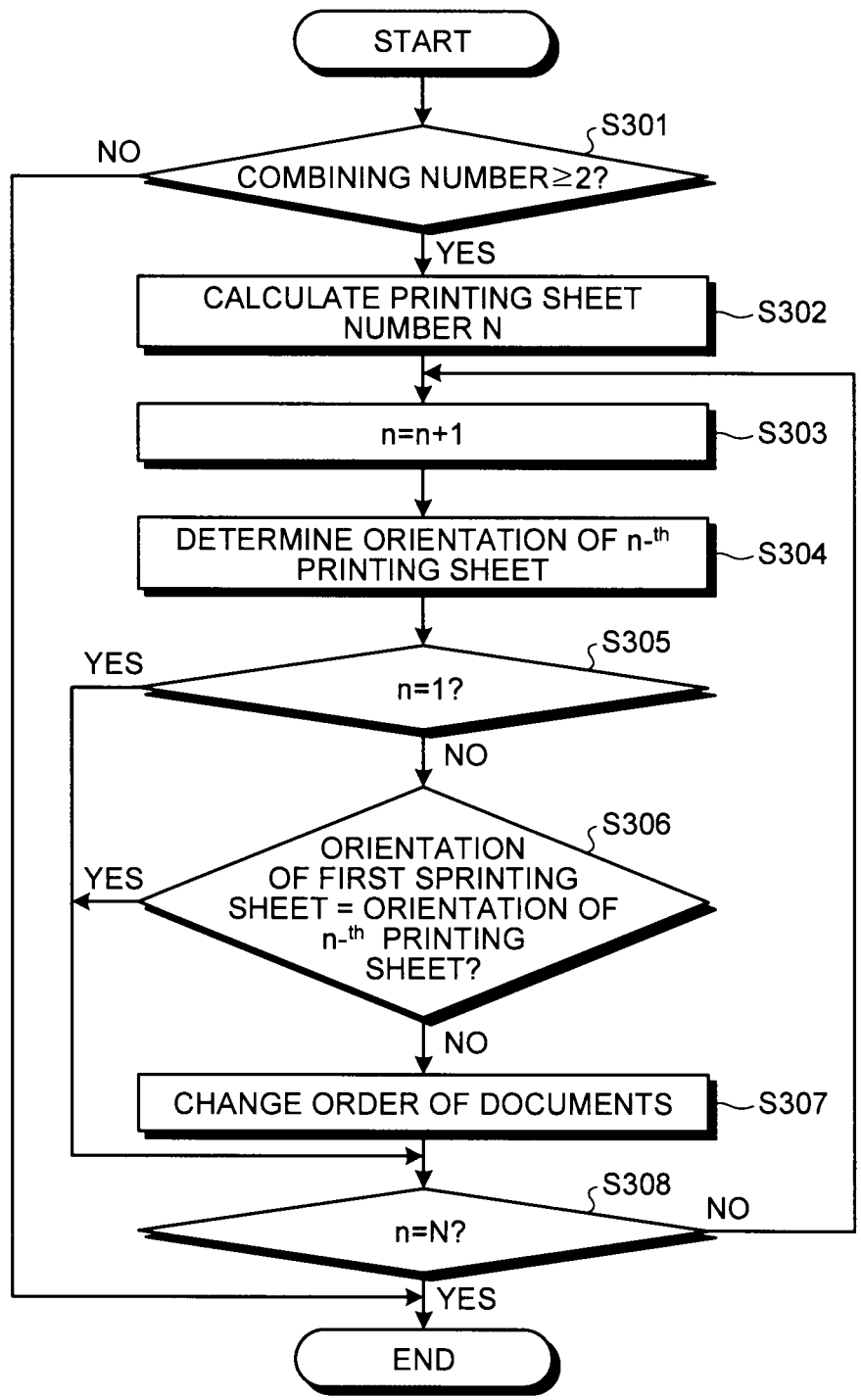
FIG. 8 is a flowchart that illustrates an example of the steps of an order changing process according to the first embodiment.

In the order changing process at Step S207, the print processor 107 determines whether the order of documents needs to be changed and, if necessary, changes the order of the documents. FIG. 8 is a flowchart that illustrates an example of the steps of the order changing process according to the first embodiment.

First, the determining unit 107a determines whether the combining number specified by the print setting is equal to or larger than two (Step S301). The combining number represents the number of pages of documents that are to be printed in combination on a single printing sheet if combined printing has been specified. For example, in the case of a 4-in-1 combined printing, the combining number is four (4).

If the combining number is smaller than two, i.e., combined printing has not been set in the print setting (No at Step S301), the order changing process is terminated. If the combining number is equal to or larger than two (Yes at Step S301), the determining unit 107a calculates the printing sheet number N, which is the number of printing sheets necessary for the combined printing, on the basis of the total number of pages of documents and the combining number (Step S302). For example, if there are eight pages of documents and the combined printing is for 4-in-1 (the combining number=4), the printing sheet number N=2 (8/4).

The determining unit 107a adds one to n (the initial value is zero), where n indicates the number of the document page to be processed (Step S303), and determines the orientation of the n-$^{th}$ printing sheet (Step S304). For example, the determining unit 107a obtains, from the print settings (DEVMODE, or the like), the orientation (landscape orientation or portrait orientation) of the document first allocated to the n-$^{th}$ printing sheet and determines the obtained orientation of the document as the orientation of the n-$^{th}$ printing sheet. A method for determining the orientation of a printing sheet is not limited to the above method. For example, the determining unit 107a may acquire, from the delivered spool file, data on the document first allocated to the n-$^{th}$ printing sheet, compare the obtained length and width of the document so as to obtain the orientation of the document, and determine the obtained orientation of the document as the orientation of the n-$^{th}$ printing sheet.

The determining unit 107a determines whether n=1 (Step S305). If n≠1 (No at Step S305), the determining unit 107a determines whether the orientation (first direction) of the first printing sheet matches the orientation (second direction) of the n-$^{th}$ printing sheet (Step S306).

If they do not match (No at Step S306), the changing unit 107b changes the order of the documents allocated to the n-$^{th}$ printing sheet (Step S307). An explanation is given later, with reference to FIG. 9, of the details of the process for changing the order of documents.

If it is determined that n=1 at Step S305 (Yes at Step S305), or if it is determined that the first direction matches the second direction at Step S306 (Yes at Step S306), or after the order of the documents has been changed at Step S307, the determining unit 107a determines whether n=N, i.e., whether the process has been performed for the final page of the printing sheet (Step S308). If n≠N (No at Step S308), the process returns to Step S303 and is repeated. If n=N (Yes at Step S308), the order changing process is terminated.

Figure 9:
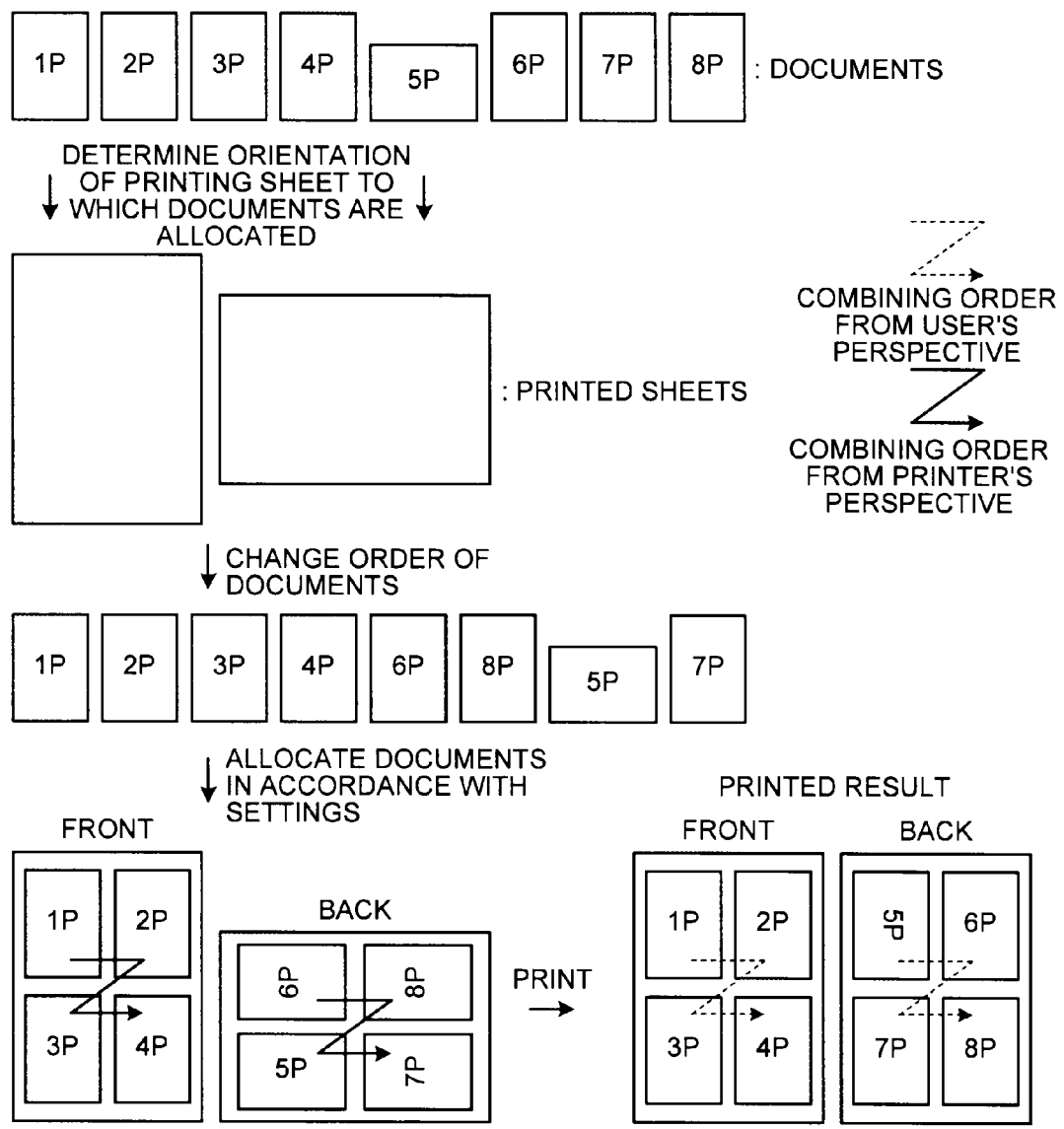
FIG. 9 is a diagram that illustrates the process for changing the order of documents.

Next, an explanation is given of the details of the process for changing the order of documents. FIG. 9 is a diagram that illustrates the process for changing the order of documents. FIG. 9 illustrates an example of a printed result of a total of 8 pages of documents (originals) with different document orientations, for which the settings are specified for combined printing, for two-sided printing, and for the combining order, i.e., "upper left, upper right, lower left, and then lower right", which is the same as that illustrated in FIG. 3.

According to the present embodiment, the print processor 107 changes the order of documents so that the documents can be printed out in the layout intended by the user. In the example illustrated in FIG. 9, the changing unit 107b of the print processor 107 changes the order of pages to be printed on the back side from "5, 6, 7, and then 8" to "6, 8, 5, and then 7". Thus, a printed result can be obtained in the layout intended by the user (the lower right section in FIG. 9).

The print processor 107 receives from the spooler 105b the spool file that contains data on all the documents (pages). Therefore, the changing unit 107b of the print processor 107 can arbitrarily change the order of documents for output. The changing unit 107b determines the order to be changed in accordance with the combining number and the combining order. For example, if the combining number=4 and the combining order is "upper left, upper right, lower left, and then lower right" as indicated by the arrow in FIG. 9, the changing unit 107b changes the order of the documents from "A, B, C, and then D" to "B, D, A, and then C". Furthermore, for example, if the combining number=4 and the combining order is "upper left, lower left, upper right, and then lower right", the changing unit 107b changes the order of the documents from "A, B, C, and then D" to "B, A, D, and then C".

An explanation is given so far of an example where the print processor 107 includes the determining unit 107a and the changing unit 107b; however, the printer driver 106 may include the determining unit 107a and the changing unit 107b.

As described above, in the information processing apparatus according to the first embodiment, if the orientation of the first document to be printed in combination on a printing sheet does not match the orientation of the first printing sheet, the order of the pages of documents to be printed in combination is changed. Thus, the documents can be printed on all printing surfaces in the layout intended by the user.

Second Embodiment

According to a second embodiment, the order of documents is changed for each printing sheet so that an easy-to-understand layout is provided for the user. In the second embodiment, the function of the print processor 107 is different from its function in the first embodiment. Furthermore, according to the second embodiment, the order changing process (Step S207 in FIG. 7) is different from the order changing process in the first embodiment. In the following, an explanation is given of the differences between the first embodiment and the second embodiment.

Figure 10:
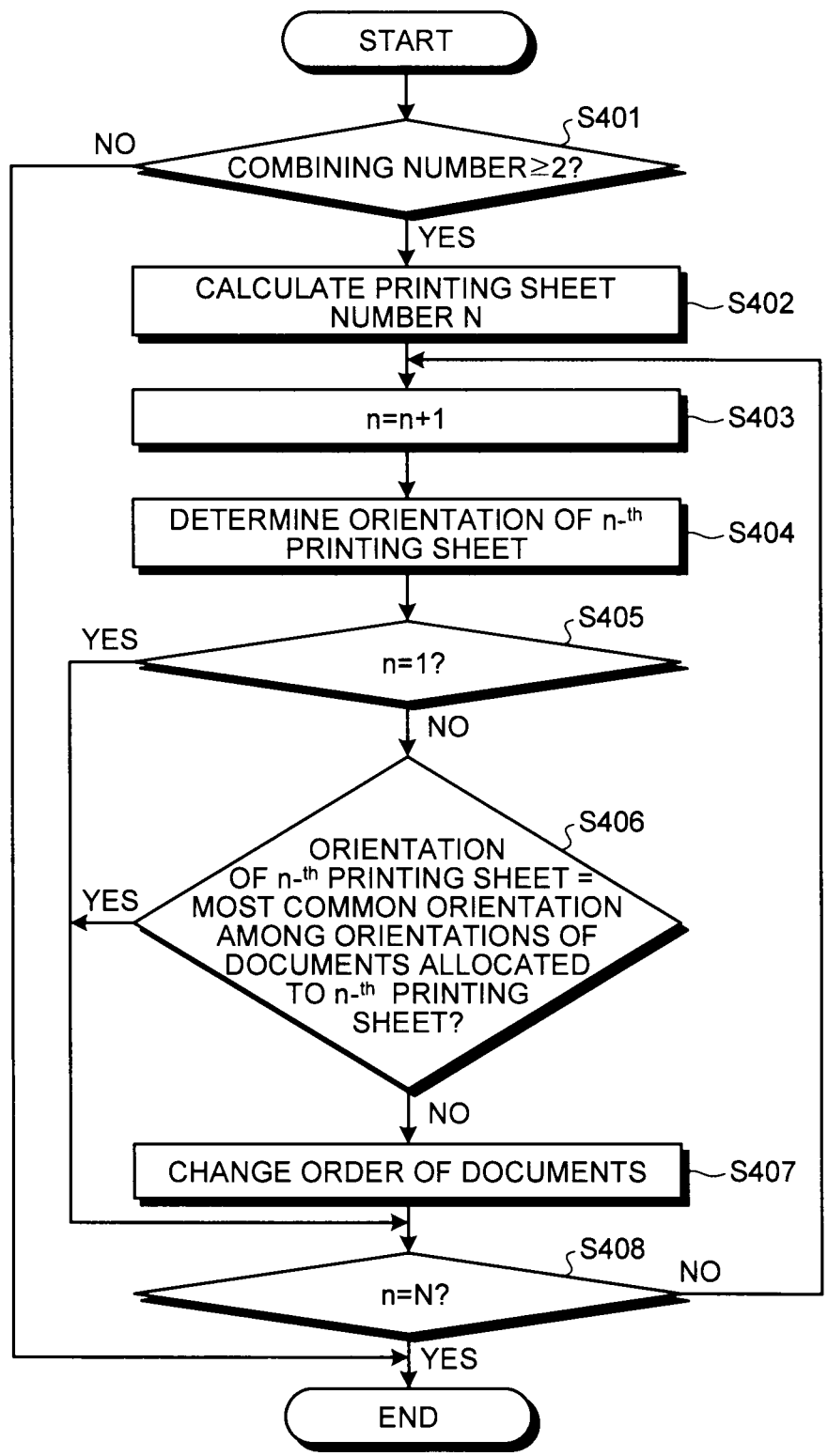
FIG. 10 is a flowchart that illustrates an example of the steps of an order changing process according to a second embodiment.

FIG. 10 is a flowchart that illustrates an example of the steps of an order changing process according to the second embodiment. In the second embodiment, the determining process at Step S406 is different from the determining process at Step S306 in FIG. 8. Because Steps S401 to S405, S407, and S408 are the same as Steps S301 to S305, S307, and S308 in FIG. 8, the explanations are omitted.

At Step S406, the determining unit 107a determines whether the orientation (hereafter, referred to as sheet orientation) of the n-$^{th}$ printing sheet matches the most common orientation (hereafter, referred to as document orientation) among the orientations of the documents allocated to the n-$^{th}$ printing sheet (Step S406).

Figure 11:
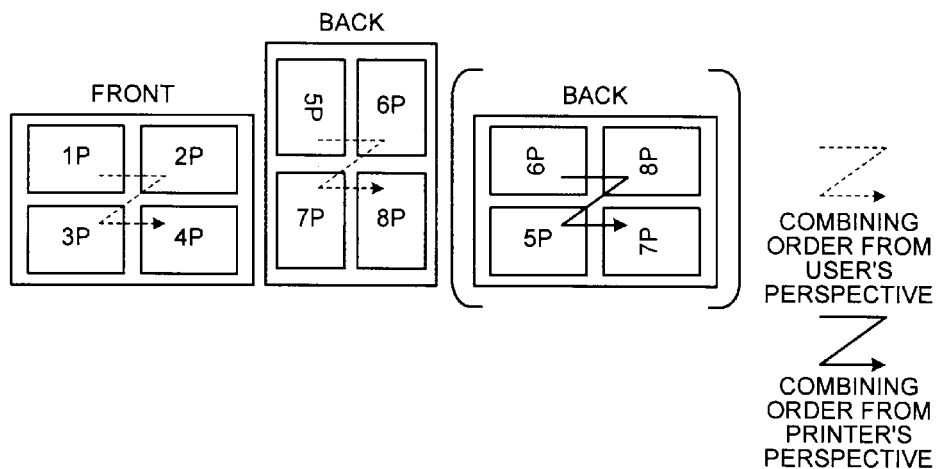
FIG. 11 is a diagram that illustrates the process for changing the order of documents.

Next, an explanation is given of the details of a process for changing the order of documents. FIG. 11 is a diagram that illustrates the process for changing the order of documents. FIG. 11 illustrates an example of a printed result of a total of 8 pages of documents (originals) with different orientations, for which the settings are specified for combined printing, for two-sided printing, and for the combining order, i.e., "upper left, upper right, lower left, and then lower right". Furthermore, FIG. 11 illustrates an example of a case where the orientations of the 8 pages of the documents are LLLLLPPP (L indicates landscape orientation, and P indicates portrait orientation).

As illustrated in FIG. 11, because 3 pages of the documents in the portrait orientation are allocated to the back side, an easy-to-understand layout is provided for a user if the back side is in the portrait orientation. In the example illustrated in FIG. 11, the orientation of the back side is set to the landscape orientation, which is the same as that of the fifth page of the document first allocated to the back side. Conversely, the most common orientation among the orientations of the documents is the portrait orientation. Therefore, the determining unit 107a determines that the orientations do not match (No at Step S406), and the changing unit 107b changes the order of the documents. In the example illustrated in FIG. 11, the changing unit 107b changes the order of pages to be printed on the back side from "5, 6, 7, and 8" to "6, 8, 5, and 7". If there are several most common orientations among the orientations of the documents allocated, the orientation to be used may be determined as appropriate.

Figure 12:
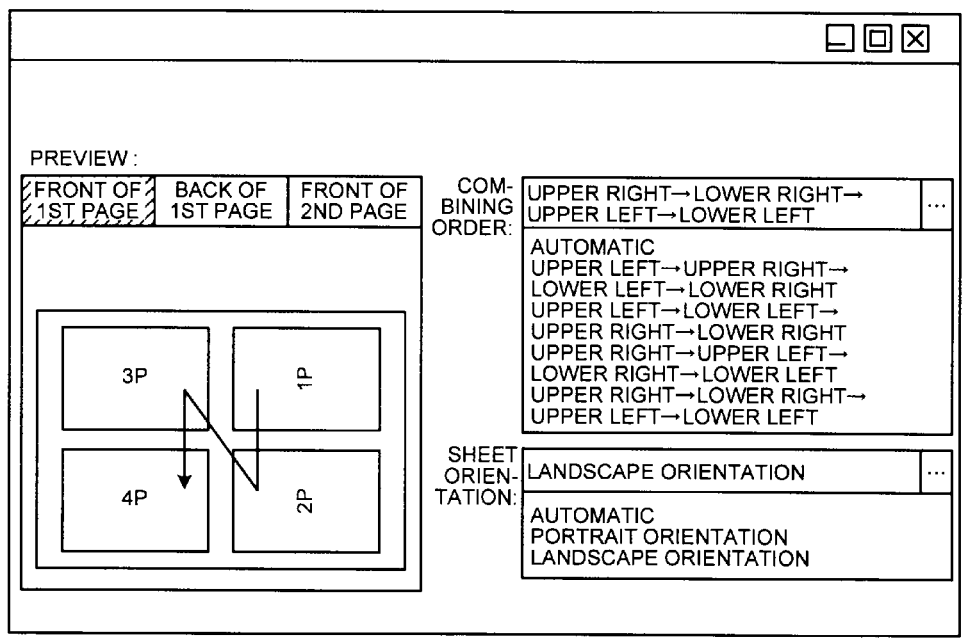
FIG. 12 is a diagram that illustrates an example of a designation screen for designating a layout.

A configuration may be adopted in which a user designates the combining order by using, for example, the UI unit 106a. Furthermore, a configuration may be such that a user designates a layout for each printing sheet. FIG. 12 is a diagram that illustrates an example of a designation screen for designating a layout. FIG. 12 illustrates an example of a designation screen that allows for the designation of the preview for each page of a printing sheet, the combining order, and the sheet orientation of a printing sheet.

Figure 13:
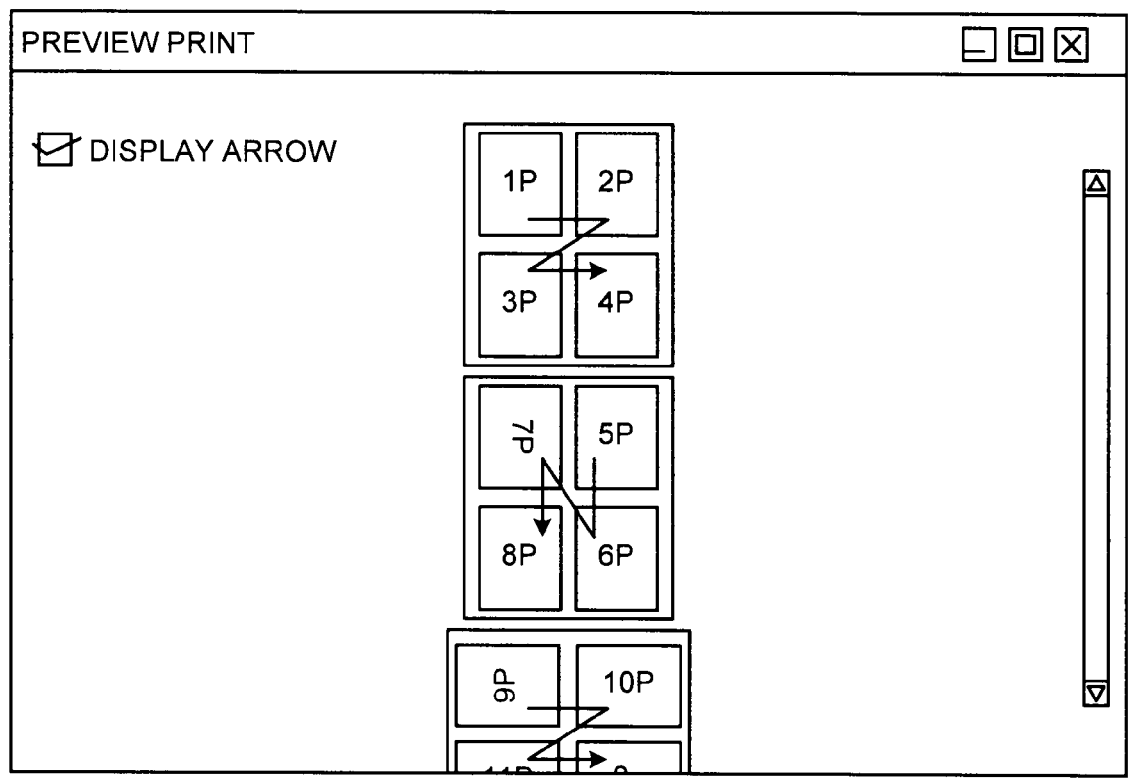
FIG. 13 is a diagram that illustrates an example of a preview screen that previews all printing sheets.

FIG. 13 is a diagram that illustrates an example of a preview screen that previews all printing sheets. FIG. 13 illustrates an example of a preview screen that displays an arrow that indicates the combining order for each printing sheet when an arrow-display check box is checked.

Figure 14:
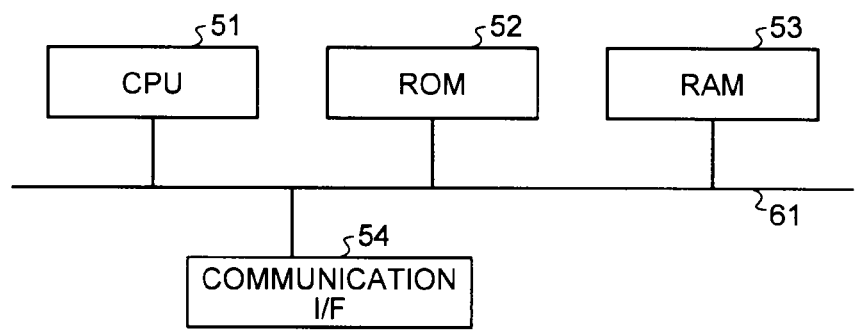
FIG. 14 is an explanatory diagram that illustrates the hardware configuration of an information processing apparatus according to the first or second embodiment.

Next, an explanation is given for the hardware configuration of an information processing apparatus according to the first or second embodiment with reference to FIG. 14. FIG. 14 is an explanatory diagram that illustrates the hardware configuration of the information processing apparatus according to the first or second embodiment.

The information processing apparatus according to the first or second embodiment includes a control device, such as a central processing unit (CPU) 51, a storage device, such as a read only memory (ROM) 52 or a random access memory (RAM) 53, a communication I/F 54 that is connected to a network for communication, an external storage device, such as a hard disk drive (HDD) or a compact disc (CD) drive device, a display device, an input device, such as a keyboard or mouse, and a bus 61 that connects each unit. The information processing apparatus has the hardware configuration that uses a commonly-used computer.

A printing program to be executed by the information processing apparatus according to the first or second embodiment is provided as a computer program product by being stored, in the form of a file that is installable and executable, in a recording medium readable by a computer, such as a compact disk read only memory (CD-ROM), a flexible disk (FD), a compact disk recordable (CD-R), or a digital versatile disk (DVD).

Furthermore, a configuration may be such that the printing program to be executed by the information processing apparatus according to the first or second embodiment is stored in a computer connected via a network such as the Internet and provided by being downloaded via the network. Moreover, a configuration may be such that the printing program to be executed by the information processing apparatus according to the first or second embodiment is provided or distributed via a network such as the Internet.

A configuration may be such that the printing program according to the first or second embodiment is provided such that it is installed in the ROM 52, or the like, in advance.

The printing program to be executed by the information processing apparatus according to the first or second embodiment has a modular configuration that includes the above-described units (the determining unit, the changing unit, and the like). In terms of actual hardware, the CPU 51 (processor) reads the printing program from the above-described storage medium and executes the read program so as to load the above-described units into a main storage device so that each of the above-described units is generated in the main storage device.

According to an aspect of the present embodiments, it is possible to print out data on all printed sides in the layout intended by the user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
    a determining unit that determines whether a print setting indicates that a combining number is two or more, and that determines, when the combining number is two or more, among documents that have different orientations and are printed in a two-sided mode on a first printing sheet and a second printing sheet that is a back side of the first printing sheet, whether a first direction, which represents an orientation of one of the documents that is first allocated on the first printing sheet, matches a second direction, which represents a most common orientation among orientations of the documents allocated on the second printing sheet;
    a changing unit that changes, when the determining unit determines that the first direction does not match the second direction, an output order of the documents to be printed in combination on the second printing sheet such that a layout represented by an arrangement order of the documents allocated on the second printing sheet becomes understandable to a user; and
    an output control unit that outputs the documents in a changed output order that is changed by the changing unit.

2. The information processing apparatus according to claim 1 further comprises
    a printer driver and
    a page control unit that controls a process of sending the document to the printer driver, wherein
    the page control unit includes the determining unit and the changing unit, and
    the printer driver includes the output control unit.

3. The information processing apparatus according to claim 1 further comprises
    a printer driver and
    a page control unit that controls a process of sending the document to the printer driver, wherein
    the printer driver includes the determining unit, the changing unit, and the output control unit.

4. An information processing method for an information processing apparatus that includes a determining unit, a changing unit, and an output control unit, the method comprising:
    determining, by the determining unit, whether a print setting indicates that a combining number is two or more;
    determining, by the determining unit, when the combining number is two or more, among documents that have different orientations and are printed in two-sided mode on a first printing sheet and a second printing sheet that is a back side of the first printing sheet, whether a first direction, which represents an orientation of one of the documents that is first allocated on the first printing sheet, matches a second direction, which represents a most common orientation among orientations of the documents allocated on the second printing sheet;
    changing, by the changing unit, when the determining unit determines that the first direction does not match the second direction, an output order of the documents to be printed in combination on the second printing sheet; and
    output-controlling, by the output control unit, that includes outputting the documents in a changed output order that is changed by the changing unit.

5. The information processing method according to claim 4, wherein the information processing apparatus further includes:
    a printer driver and
    a page control unit that controls a process of sending the document to the printer driver, wherein
    the page control unit includes the determining unit and the changing unit, and
    the printer driver includes the output control unit.

6. The information processing method according to claim 4, wherein the information processing apparatus further includes:
    a printer driver and
    a page control unit that controls a process of sending the document to the printer driver, wherein
    the printer driver includes the determining unit, the changing unit, and the output control unit.

7. A computer program product comprising a non-transitory computer-usable medium having computer-readable program codes embodied in the medium for an information processing apparatus that includes a determining unit, a changing unit, and an output control unit, the program codes, when executed, causing a computer to execute:
    determining, by the determining unit, whether a print setting indicates that a combining number is two or more;
    determining, by the determining unit, when the combining number is two or more, among documents that have different orientations and are printed in two-sided mode on a first printing sheet and a second printing sheet that is a back side of the first printing sheet, whether a first direction, which represents an orientation of one of the documents that is first allocated on the first printing sheet, matches a second direction, which represents a most common orientation among orientations of the documents allocated on the second printing sheet;
    changing, by the changing unit, when the determining unit determines that the first direction does not match the second direction, an output order of the documents to be printed in combination on the second printing sheet such that a layout represented by an arrangement order of the documents allocated on the second printing sheet becomes understandable to a user; and
    output-controlling, by the output control unit, that includes outputting the documents in a changed output order that is changed by the changing unit.

8. The information processing apparatus according to claim 1, wherein the orientations of the documents include a landscape orientation and a portrait orientation.

9. The information processing method according to claim 4, wherein the orientations of the documents include a landscape orientation and a portrait orientation.

10. The computer program product comprising the non-transitory computer-usable medium according to claim 7, wherein the orientations of the documents include a landscape orientation and a portrait orientation.

* * * * *